Patented Aug. 16, 1932

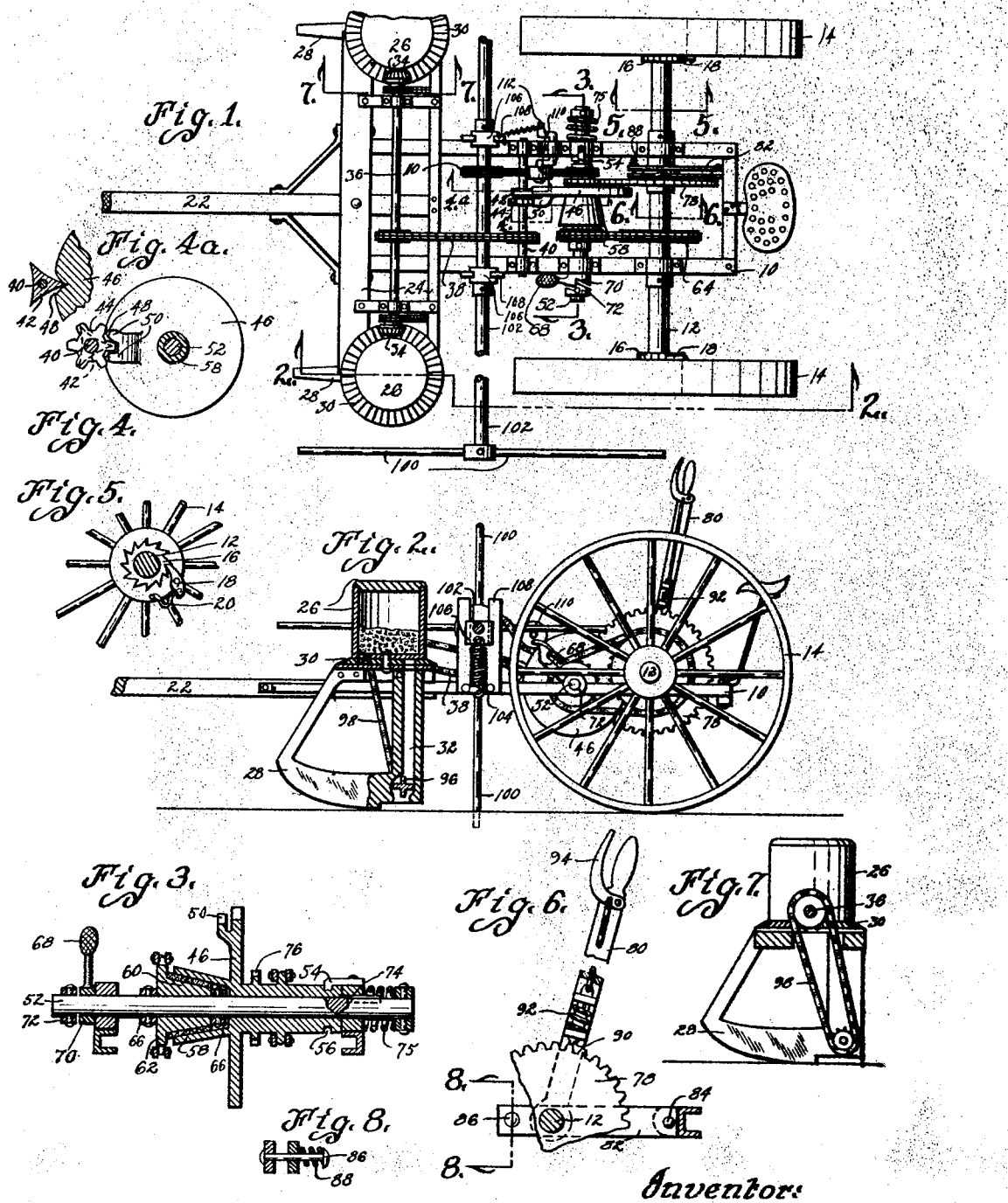

1,872,393

UNITED STATES PATENT OFFICE

HUGH E. BISHOP, OF UDELL, IOWA

CHECK ROW PLANTER

Application filed March 10, 1930. Serial No. 434,611.

The object of my invention is to provide a check row planter which is simple, durable and comparatively inexpensive to manufacture.

A further object of my invention is to provide a check row planter for planting grain without the necessity of using a wire stretched across the field to be planted and having buttons at intervals to drop the grain from the planter into equally spaced hills.

Still a further object is to provide mechanism for dispensing grain from the planter, such mechanism being operated from the traction wheels of the planter through a clutch mechanism which may be disengaged when transporting the planter from one position to another or the like.

Still a further object is to provide a marking mechanism to indicate the positions of the planted hills of grain, the marking mechanism being arranged for upward movement relative to the planter frame in the event it strikes an obstruction.

Still a further object is to provide the clutch mechanism and a manually operable means for actuating the grain dispensing mechanism whereby hills of grain being planted may be checked with hills of grain already planted in a previous round.

Still a further object is to provide a novel intermittent operating mechanism for driving the grain dispensing mechanism from the continuously rotating traction wheels of the planter.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a plan view of a check row planter embodying my invention.

Figure 2 is a side elevation of the same parts of the device being shown in section on the line 2—2 of Figure 1.

Figure 3 is a sectional view on the line 3—3 of Figure 1 illustrating the clutch mechanism of the check row planter.

Figure 4 is a sectional view on the line 4 of Figure 1 illustrating the intermittent mechanism of the device.

Figure 4A is a sectional view on the line 4a of Figure 1 showing further details of the intermittent mechanism.

Figure 5 is a sectional view on the line 5—5 of Figure 1 showing a ratchet connection between the traction wheel and the main shaft of the planter.

Figure 6 is a sectional view on the line 6—6 of Figure 1 illustrating a manual control for the grain dispensing mechanism.

Figure 7 is a sectional view on the line 7—7 of Figure 1 illustrating a grain dropping mechanism and Figure 8 is a detailed sectional view on the line 8—8 of Figure 6.

On the accompanying drawing I have used the reference numeral 10 to indicate a frame. A main shaft 12 is journalled on the frame 10 and traction wheels 14 are journalled on the shaft 12. A ratchet and pawl device indicated as 16 and 18 respectively (see Figure 5) is provided for each traction wheel 14 whereby the fastest turning traction wheel will rotate the main shaft 12. A spring 20 is provided for each pawl 18.

A tongue 22 is provided for pulling the planter and cross frame members 24 are provided for supporting grain receptacles 26 and furrow shoes 28. A grain dispensing mechanism consisting of a rotating plate 30 with a series of openings to receive grain from the receptacles 26 and discharge it into passageways 32 is provided. Bevel gear teeth are formed on the rotary plates 30 for coaction with bevel pinions 34 which are mounted on a shaft 36.

The shaft 36 is driven through a chain connection 38 from a shaft 40 having a star wheel 42 thereon and a pinion 44 having two teeth for each point of the star wheel 42. The star wheel 42 may be three-pointed as illustrated or have any number of points desired and each curved surface between two adjacent points is adapted to coact with the periphery of a notched disk 46, the notch of which is indicated at 48. The notched disk 46 is provided with a pair of gear teeth 50 adjacent the notch 48 as best shown in Figures 4 and 4a of the drawing.

The disk 46 is rotatably mounted on a clutch shaft 52 and is prevented from longitudinal movement thereon and relative to the frame 10 by means of a clip 54 engaging in a groove 56 (see Figure 3). The disk 46 is provided with a cone 58 with which a friction surfaced cone 60 may coact for rotating the disk from the cone 60. The cone 60 is formed on a sprocket 62 which is driven by a chain 64 from the main shaft 12. Collars 66 prevent longitudinal movement of the clutch cone 60 relative to the clutch shaft 52 but allow free rotary movement of the cone relative thereto.

A clutch pedal 68 is provided having cam surfaces 70 which coact with a cam collar 72 which is secured to the clutch shaft 52. Rotation of the shaft 52 is prevented by a key 74 in one of the bearings for the clutch shaft. A spring 75 is provided to cause the collar 66 to force the cones 58 and 60 into engagement whereupon the cam collar 72 assumes a position adjacent the cam surface 70.

Means for manually adjusting the clutch is provided in the form of a pinion 76 on the clutch member 58 meshing with a gear 78.

The gear 78 is freely rotatable on the main shaft 12 and is driven from the clutch whenever the clutch is in motion. A lever 80 is freely rotatable on the main shaft 12 and normally held in any position to which it may be moved by a pair of friction bars 82. The friction bars 82 are anchored at 84 to the frame 10. The shaft 12 extends loosely through them and they are mounted on opposite sides of the lever 80. Their free ends are provided with a bolt 86 and spring 88 whereby to cause friction of the bars 82 on the lever 80 for normally holding it in a stationary position.

A dog 90 is slidably mounted on the lever 80 and normally held raised by a spring 92. The dog 90 may be lowered by manual actuation of a finger 94 against the action of a spring 92.

*Practical operation*

In the operation of my device, assuming the planter to be in use, the traction wheels 14 through the pawls 18 drive the main shaft 12, rotation of which is imparted to the clutch member 60. The clutch member 60 is in frictional engagement with the cone 58 for rotating the notched disk 46 whereby each revolution of the notched disk will impart a partial revolution to the star wheel 42 by means of the teeth 50 engaging the pinion 44. This will cause intermittent rotation of the shaft 40, the shaft 36, the grain dispensing disk 30 and a grain dropping wheel 96 in the bottom of the planter shoe 28 which is driven by a chain 98 from the shaft 36. Thus the grain will be intermittently dropped from the wheel 96, the wheel being quite close to the ground to prevent any uncertainty in the positioning of the hill of grain caused by a long travel of the grain after being dropped.

Thus the hills will be periodically spaced throughout the length of the field being planted.

The spoke arms 100 of a marking shaft 102 will indicate the positions of the hills by making marks in the ground surface which can be seen when the next row of grain is planted so as to check the hills crosswise of the field. If the hills are out of alignment, the clutch pedal 68 can be depressed for allowing the planting mechanism and marking mechanism to stop momentarily for adjusting the hills backward and if it so happens that they must be adjusted forward, the lever 80 is then manipulated with a rearward motion (the dog 90 being depressed into a tooth of the gear 78) to effect such forward adjustment.

Springs 104 are provided to allow upward movement of the marker shaft 102 in the event of striking an obstruction in the field. The bearings 106 for the marker shaft 102 are vertically slidable relative to supporting brackets 108. A chain connection 110 is provided between the clutch and the marker shaft 102. A chain tightener 114 is provided to allow upward movement of the marker shaft 102 and yet keep the operation of the marker properly timed with the rest of the planter mechanism. The various sprockets and gears are, of course, of the proper proportional sizes to obtain timing of the mechanism to drop the grain at specified intervals as desired.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a check row planter, a frame, traction wheels therefor, a clutch shaft journalled thereon, a clutch on said shaft, a grain container, mechanism for dispensing grain therefrom, an operative connection between said clutch and said mechanism, said connection comprising a notched disk driven by the clutch, a star wheel coacting therewith, a pair of teeth carried by said disk adjacent the notch therein and a pair of teeth adjacent said star wheel for each point thereof.

2. In a check row planter, a frame, traction wheels therefor, a clutch shaft journalled thereon, a clutch on said shaft, a grain container, mechanism for dispensing grain therefrom, an operative connection between said clutch and said mechanism, a lever for manually adjusting said clutch and having a normally retracted dog which may be manually extended when it is desired to adjust the clutch, a pair of bars anchored to said frame and positioned on opposite sides of said lever and spring means constraining said bars to engage said lever to thereby retain said lever in a position of rest.

3. In a check row planter, a frame, traction wheels therefor, a clutch shaft slidably supported thereon, means for preventing rotation of said clutch shaft relative to said frame, a clutch member rotatable on said shaft and driven from said traction wheels, a second clutch member thereon for coaction with the first clutch member, a grain container, mechanism for dispensing grain therefrom, an operative connection between said second clutch member and said mechanism, a spring for holding said clutch members in contact with each other, a clutch pedal rotatable on said clutch shaft and having a cam member, and a cam member coacting therewith and secured to said clutch shaft whereby rotation of the clutch pedal and its cam member will slide the clutch shaft against the action of said spring.

Des Moines, Iowa, March 4, 1930.

HUGH E. BISHOP.